United States Patent
Prevett

[11] 3,744,932
[45] July 10, 1973

[54] AUTOMATIC SEQUENCE CONTROL SYSTEM FOR PUMP MOTORS AND THE LIKE

[75] Inventor: Peter D. Prevett, Melrose, Mass.
[73] Assignee: Prevett Associates, Inc., Melrose, Mass.
[22] Filed: Apr. 30, 1971
[21] Appl. No.: 138,885

[52] U.S. Cl. .................................. 417/8, 417/7
[51] Int. Cl. ...................................... F04b 41/06
[58] Field of Search .................... 417/5, 6, 7, 8; 222/71

[56] References Cited
UNITED STATES PATENTS

| | | | |
|---|---|---|---|
| 3,005,411 | 10/1961 | Metz | 417/6 |
| 3,160,101 | 12/1964 | Bartoseski et al. | 417/7 |
| 3,294,023 | 12/1966 | Martin-Vegue, Jr. et al. | 417/7 |
| 3,511,579 | 5/1970 | Gray et al. | 417/6 |
| 3,610,779 | 10/1971 | Hubby | 417/5 |

Primary Examiner—Carlton R. Croyle
Assistant Examiner—Richard Sher
Attorney—Morse, Altman & Oates

[57] ABSTRACT

A system is provided for automatically controlling the number and sequence of operation of a plurality of motive devices such as pump motors in a common pumping system. The flow rate of a pumped liquid or other medium is monitored by a flow meter which generates a frequency output related to the flow rate. The flow meter output is converted to digital form to drive a counter having an output to a storage register. Timing controls operate the counter, storage register and logic gates receiving the output of the storage register and these in turn operate the motors controlling both the sequence of their operation and number in operation according to demand requirements as monitored by the flow meter. Switching means are provided to automatically by-pass disabled equipment and cyclically to vary the operating sequence so as to distribute uniformly use of the motors, pumps and the like.

10 Claims, 7 Drawing Figures

Patented July 10, 1973

INVENTOR,
PETER D. PREVETT
BY
Morse, Altman & Oates
ATTORNEYS

Patented July 10, 1973

INVENTOR.
PETER D. PREVETT
BY
Morse, Altman & Oates
ATTORNEYS

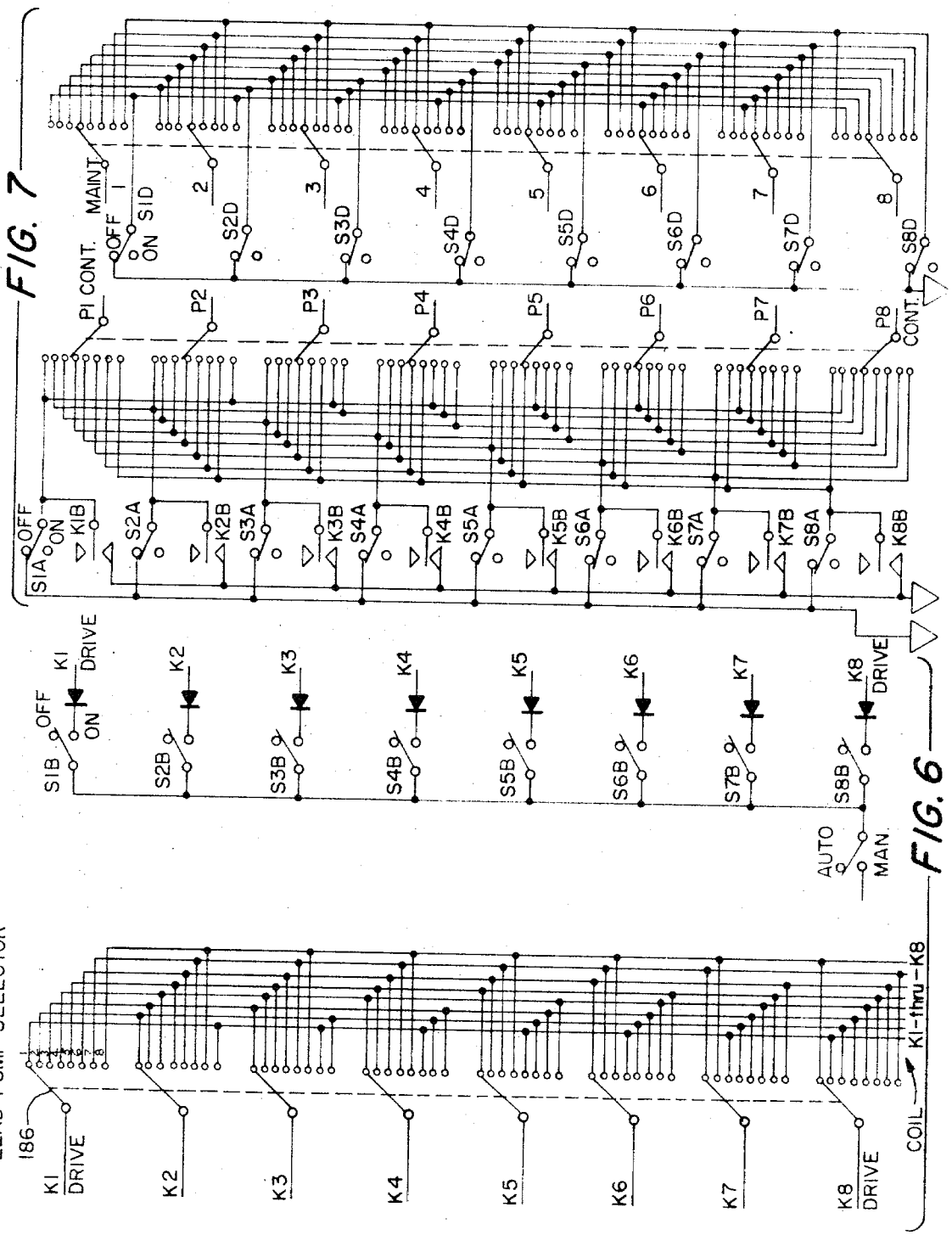

AUTOMATIC SEQUENCE CONTROL SYSTEM FOR PUMP MOTORS AND THE LIKE

BACKGROUND OF THE INVENTION

1. Field of the Invention

This invention relates generally to automatic control systems and more particularly is directed towards a system for automatically controlling the number and sequence of operation of a plurality of power driven pumps.

2. Description of the Prior Art

Many supply systems involve a number of motors or other motive devices which must be turned on and off according to changes in demand. For example, in a fuel pumping system a typical installation would involve a number of motor-driven pumps connected to a common manifold for delivering liquid fuel to a remote location. While systems have been developed heretofore for controlling the pumps to meet fluctuating demands, such systems have not been entirely satisfactory for various reasons including complexity, bulkiness and reliability. Systems of this type heretofore have not been able to cope with all possible conditions which may arise in the operation of multiple motor systems and have been generally lacking in the flexibility as to operation and motor control.

It is an object of the present invention to provide improvements in automatic motor control systems and more particularly to provide a new and improved automatic pump sequence control system of compact design and flexible operation.

SUMMARY OF THE INVENTION

This invention features an automatic sequence control system for use with multiple motor-driven pumps or the like, comprising a flow meter adapted to sense the flow rate from the pumps and generate a signal the frequency of which is related to the flow rate. An analog to digital converter connected to the flow meter converts the frequency signal into digital signals which are fed to a counter where the pulses are counted and transferred to a storage register. Timing controls connected to the counter and to logic gates generate timing signals to control the counter, register and the gates which are operatively connected to the several motors in the system whereby the number and sequence of the motors are sequentially controlled in response to demand at the meter.

BRIEF DESCRIPTION OF THE DRAWINGS

FIG. 6 is a circuit diagram showing switches for changing the sequence of pump operation, and, FIG. 7 is a diagram of the pump condition sensing circuit.

DETAILED DESCRIPTION OF THE PREFERRED EMBODIMENT

Figure 1:
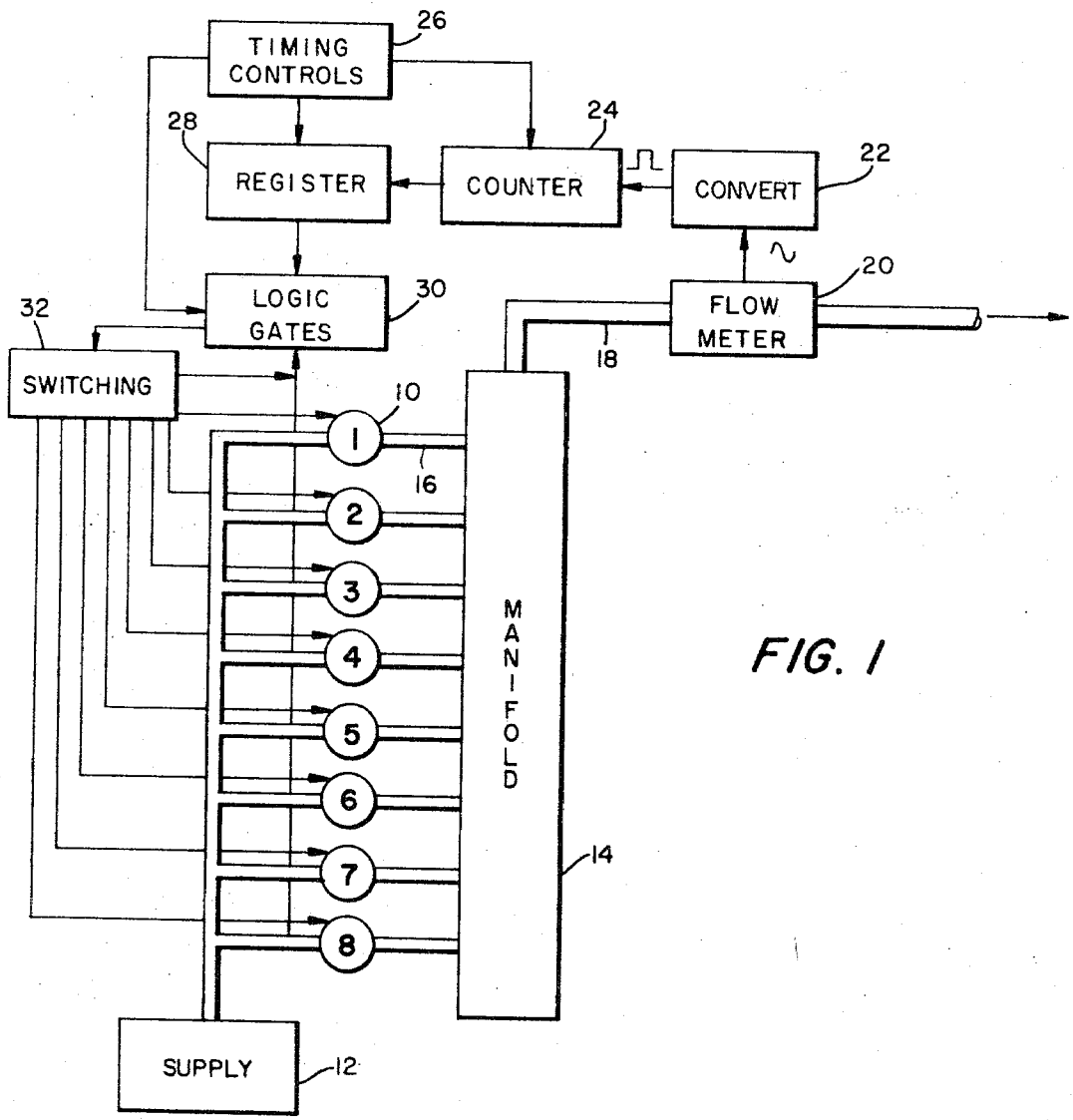
FIG. 1 is a block diagram of a sequence control system made according to the invention and embodied in a pumping system.

Referring now first to FIG. 1, a general description of the system will be given followed by detailed descriptions of the various portions of the circuit. In FIG. 1 the invention is shown applied to the control over a number of pumps in a pumping system wherein the pumping demand may fluctuate rapidly. Such systems are commonly used to pump fuel at a fueling or transfer station, for example, and the delivery requirements may fluctuate over a wide range within a relatively short period of time. In FIG. 1 the system is generally organized about a bank of power-driven pumps 10 which, by way of example are illustrated as eight in number although the number can be increased or decreased according to the maximum requirements of the particular installation. For convenience, these pumps are numbered 1 through 8 and typically each pump would be motor-driven although other drive means such as turbine or diesel motors responsive to the control system may be employed. The pumps are connected to a supply source 12 which may be common to all pumps or the pumps may connect to several sources of supply with all pumps connected to a common manifold 14 through conduits 16. The manifold has a single discharge line 18 for delivering the liquid to one or more discharge points which may be close to or remote from the pumping station.

In the discharge line 18 is connected a transducer 20 which generates an output signal related to the fluid flow rate through the line. In the preferred form of this invention the transducer 20 is a turbine meter having an alternating voltage output signal the frequency of which is proportional to the fluid flow rate through the meter. Devices of this type are available from General Signal Corporation of Providence, R. I. The frequency output of the meter 20 is converted to a square wave at half the frequency by means of a converter 22, these pulses being fed into a counter 24. Upon command from a timing control unit 26 the count in the counter is transferred to and stored in a storage register 28 in natural binary coded decimal (NBCD) form. Again upon command, the NBCD information in the register 28 is fed into a set of logic gates 30 and the pumps 1 through 8 are interrogated until a pump is found which is not running and available for operation. This pump is then turned on.

The timing control unit 26 cycles every second so that the count information is up-dated every second and, if the demand is such that an additional pump must be actuated where there is an increase in demand, or a pump should be turned off where there is a reduction in demand, the appropriate response is made.

The system functions in such a fashion that the number of pumps in operation at any given time meets the pumping needs with the number of operating pumps responding automatically to supply and demand conditions. If there is no demand whatsoever, all pumps will be off. If demand increases, the number of pumps in operation increases accordingly, up to the capacity of the system. The system operates in such a fashion that if:

$F < F_1$ then 0 pumps will be operating,
$F_1 < F < F_2$ then 1 pumps will be operating, $F_2 < F < F_3$ then 2 pumps will be operating,
$F_3 < F < F_4$ then 3 pumps will be operating, $F_4 < F < F_5$ then 4 pumps will be operating,
$F_5 < F < F_6$ then 5 pumps will be operating,
$F_6 < F < F_7$ then 6 pumps will be operating,
$F_7 < F < F_8$ then 7 pumps will be operting,
$F_8 < F$ then 8 pumps will be operating, Where F is one half the frequency output of the turbine meter, which frequency is converted to natural binary coded decimal form.

The system may be operated in either a manual mode or an automatic mode with a mode selection switch 32 provided for switching from one mode to the other. With the mode selection switch in the manual position, any pump can be operated independently of demand requirements.

With the mode selection switch 32 in the automatic mode position individual pump selector switches can be either on or off. If any pump or motor is inoperative for any reason, its associated pump selector switch will be in the off position. A sequence selector switch is provided for selectively varying the sequence in which the pumps will be turned on or off. The sequence of operation of the pumps in this system is variable according to the following combinations:

1. 1-2-3-4-5-6-7-8
2. 2-3-4-5-6-7-8-1
3. 3-4-5-6-7-8-1-2
4. 4-5-6-7-8-1-2-3
5. 5-6-7-8-1-2-3-4
6. 6-7-8-1-2-3-4-5
7. 7-8-1-2-3-4-5-6
8. 8-1-2-3-4-5-6-7

Therefore, with the system in the automatic mode and the desired operating sequence of the pumps selected, the system will respond to supply and demand, automatically picking up the necessary number of pumps in sequence to meet demand up to the maximum number available. The turn-off procedure is the reverse of the turn-on procedure with the last pump turned on being the first one turned off.

Figure 2:
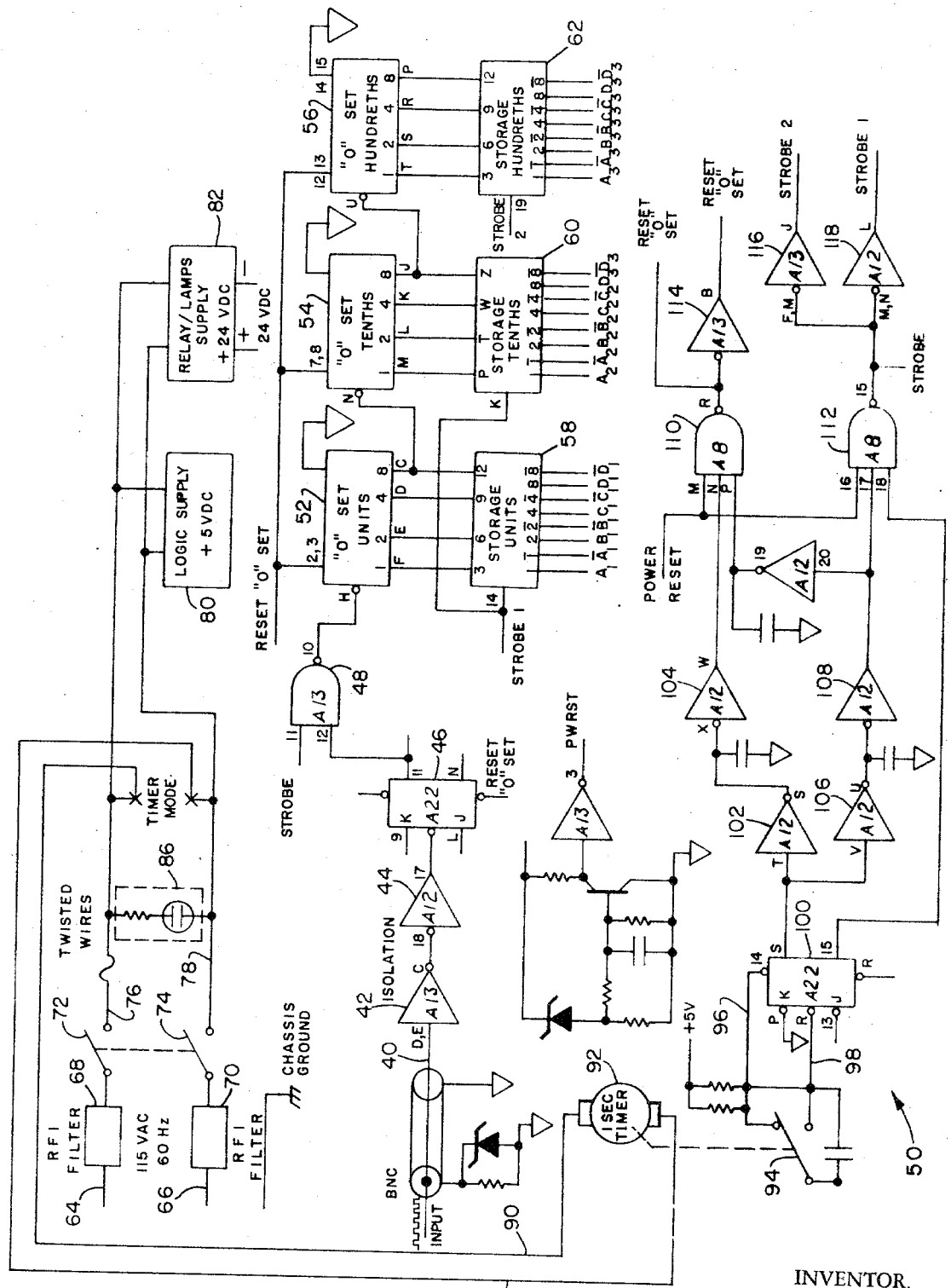
FIG. 2 is a logic diagram showing the counter register and timing control portions of the system.

Referring now to FIG. 2 of the drawings the square wave output from the converter 22 of FIG. 1 is fed through a shielded cable 40 to an amplifier 42 having an inverted output and an amplifier 44 having an inverted input. The amplified pulses are then fed into a JK flip flop 46 with an output to a NAND gate 48 also receiving strobe pulses from a strobe timing circuit generally indicated by reference character 50. The output of the NAND gate 48 is to a series of counters 52, 54 and 56 adapted to count units, tenths and hundredths, respectively. The function of the counters is to count the number of pulses received from the turbine generator through the converter insofar as the number of pulses is proportional to the rate of flow of the monitored fluid. On command from the strobe pulse timing circuit, the count in the counters 52, 54 and 56 is dumped into storage registers 58, 60 and 62, the count being stored in natural binary coded decimal form.

The system is energized by lead connections 64 and 66, each lead connected to radio frequency interference filters 68 and 70 and provided with ganged switches 72 and 74 adapted to open and close circuits to leads 76 and 78. The latter leads are connected to a 5 volt DC power supply 80 for the logic circuits and a 24 volt DC power supply 82 for relays and lamps in the system. The power circuit may include a fuse with an indicator light 86.

The power source connects via leads 88 and 90 to a one-second timer 92 which operates a switch 94 whereby one-second timing pulses are produced and fed first through a lead 96 and then through a lead 98 to a flip-flop 100. The flip-flop has an output to parallel amplifying circuits each comprised of amplifiers 102 and 104 and amplifiers 106 and 108, each amplifying circuit providing an input to a NAND gate 110 and 112, respectively. The NAND gate 110 has an output to an amplifier 114 which generates a reset "0" set signal for the counters 52, 54 and 56. The gate 110 generates a reset "0" set signal for the flip-flop 46. The NAND gate 112 has an output to parallel amplifiers 116 and 118 generating strobe pulses for the storage registers.

Figure 3:
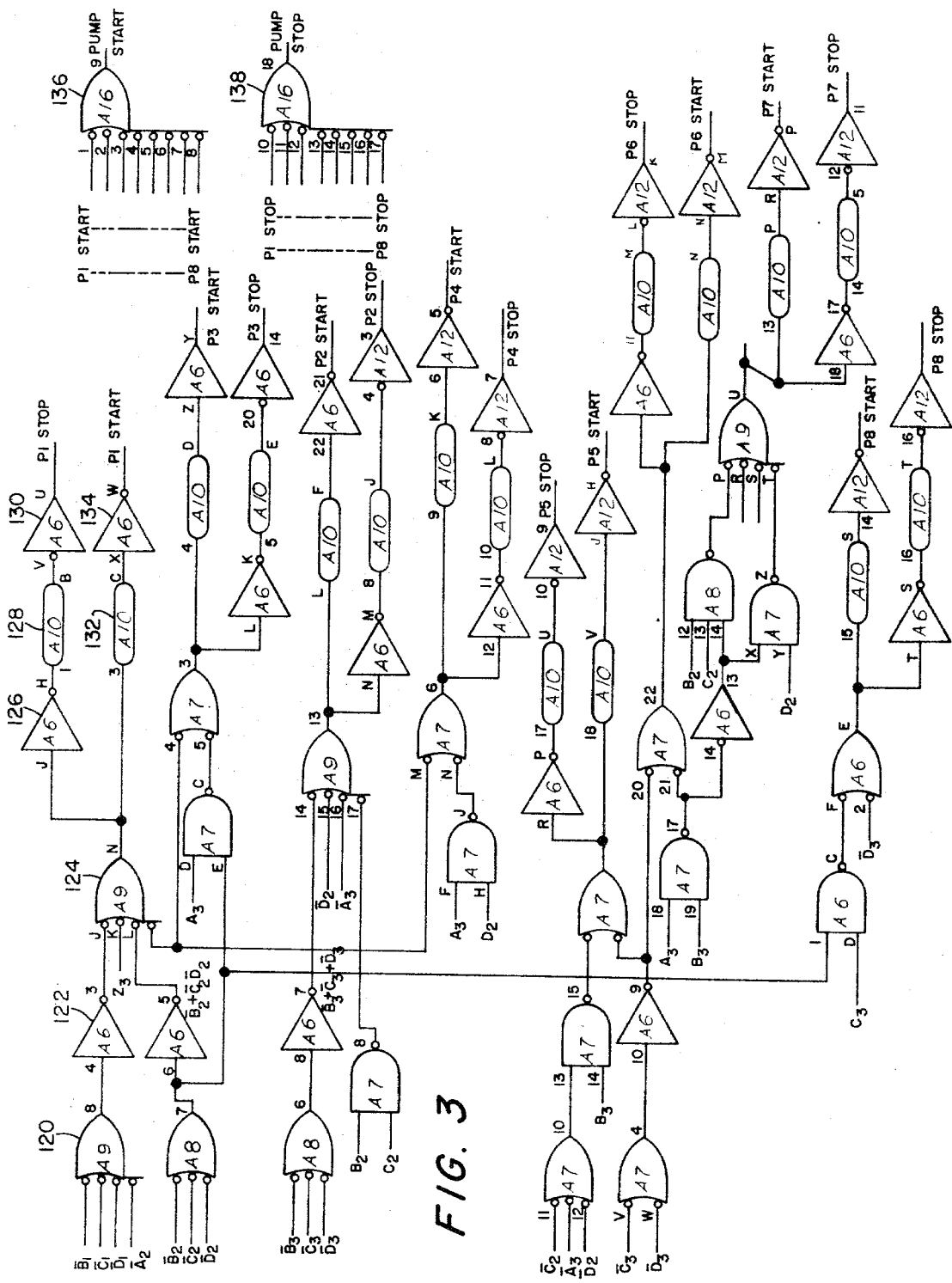
FIG. 3 is a logic diagram of the decoding matrix employed in the system.

On command from the timing pulses, the NBCD information in the storage registers is released and fed through the logic gates of the decoding matrix of FIG. 3. The output leads of the storage registers of FIG. 2 are labeled to show the corresponding inputs for the gates of FIG. 3. The decoding matrix is comprised of similar sets of logic circuits adapted to generate starting and stopping signals for the pumps and each pump, in turn, is connected to the matrix so that it will furnish a signal that it is on or available for use to avoid a condition where a pump might be out of service for repair. In view of the repetitive characteristics of the decoding matrix and the remaining logic system only a portion will be described in detail, it being understood that the remainder of the system functions in a similar fashion. Each portion of the decoding matrix is comprised of a NAND gate 120 receiving inputs from the storage register, as labeled, and an output to an amplifier 122 with an inverted output. The output of the amplifier is to a NAND gate 124 receiving inputs from parallel NAND gates and amplifiers as shown. The output of the NAND gate 124 is to a parallel circuit, one portion comprised of an amplifier 126 with an inverted output a passive delay element 128 and an amplifier 130 with an inverted input from which is generated a stop signal for pump No. 1. The other portion of the parallel circuit includes a passive delay element 132 and an amplifier 134 with an inverted output which produces a start signal for pump No. 1. The remaining portion of the decoding matrix is similarly arranged for the various pumps.

The amplifier outputs of the decoding matrix feed into stop and start NAND gates 136 and 138 respectively, each gate generating a pump start or a pump stop signal as an output.

Figure 4:
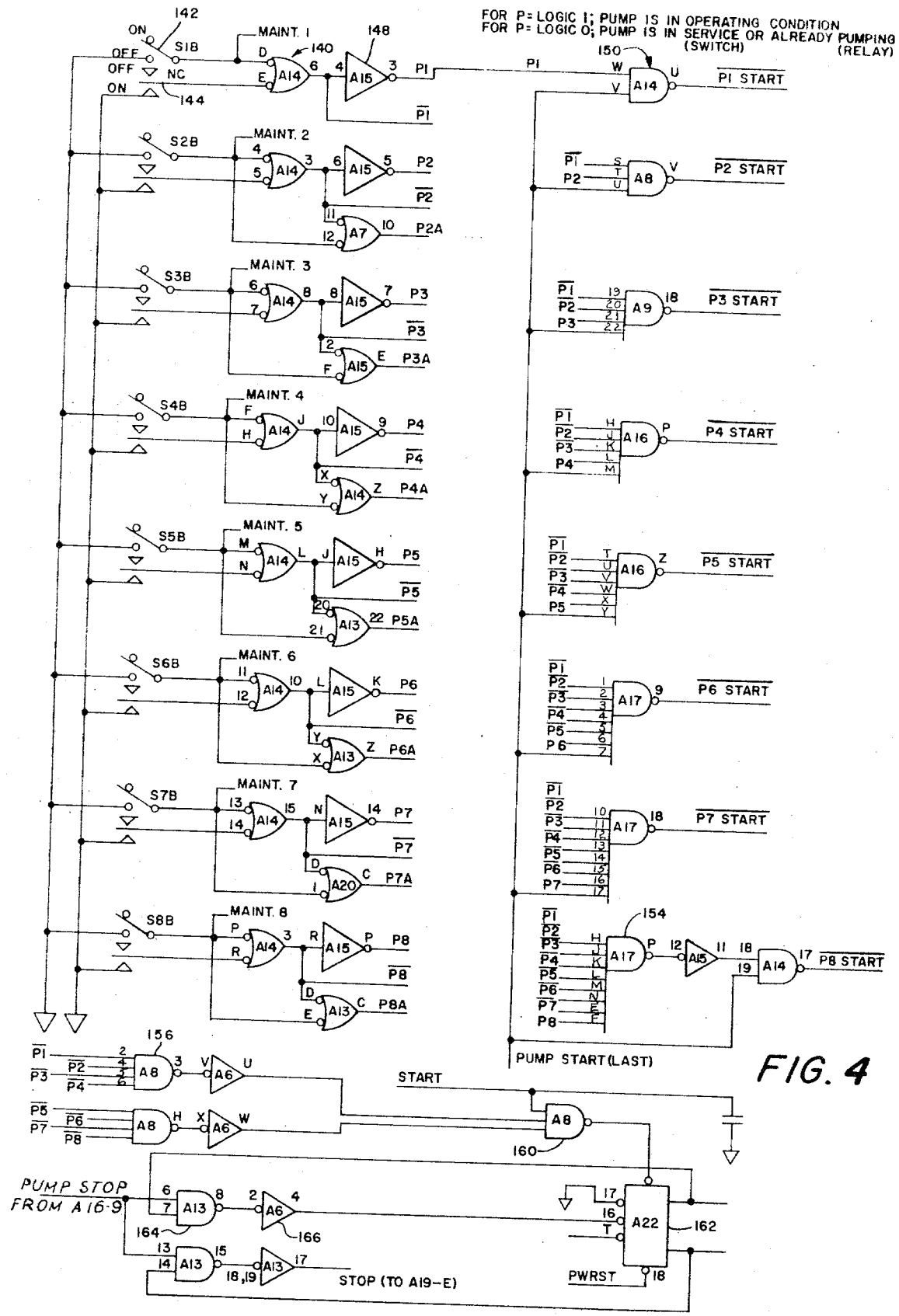
FIG. 4 is a logic diagram showing further operative components in the system for generating stop and start signals.

Referring now more particularly to FIG. 4, there are shown the logic components for generating stopping and starting signals for the pumps and for manually disconnecting one or more pumps from the system. In FIG. 4, each of a series of NAND gates 140 is provided with two inputs, one from a manual switch 142 and another from a switch 144 forming part of the contacts for a relay, the coil of which is shown at 146 in FIG. 5. The contacts for the relay are normally closed. As indicated in the legend on FIG. 4, if the P signal output is a logical 1 the associated pump is in an operating condition, whereas if the P signal is a logical 0 then the pump is either in service, as determined by the switch 142, or is already pumping, as determined by the position of the relay switch. The output from the NAND gate 140 is to an inverting amplifier 148 with a parallel lead providing an opposite signal. The output of the amplifier 148 is to a NAND gate 150 also having as an input a pump start signal from a lead 152 connected to all of the NAND gates in that array. The other NAND gates in the group 150 each accumulates on additional input up to the last NAND gates 154 in that group which has eight input signals, all of which must be present before the associated gate generates a pump starting signal. Thus, the first NAND gate 150 has two inputs as conditions for generating a start signal, the next NAND gate will require three inputs to be present, the next requiring four input signals to be present etc. Each of the NAND gates 150 obtains signals from the preceding amplifiers 148, etc., in increasing order. The output of the gate 140 also provides an input to a NAND gate 156, processed through an amplifier 158 to a NAND gate 160 with three input connections, one a start signal and the third from other NAND gates in the group 140. The output of the gate 160 is to a flip-flop 162 which also receives pump stop signals through a NAND gate 164 and an amplifier 166.

Figure 5:
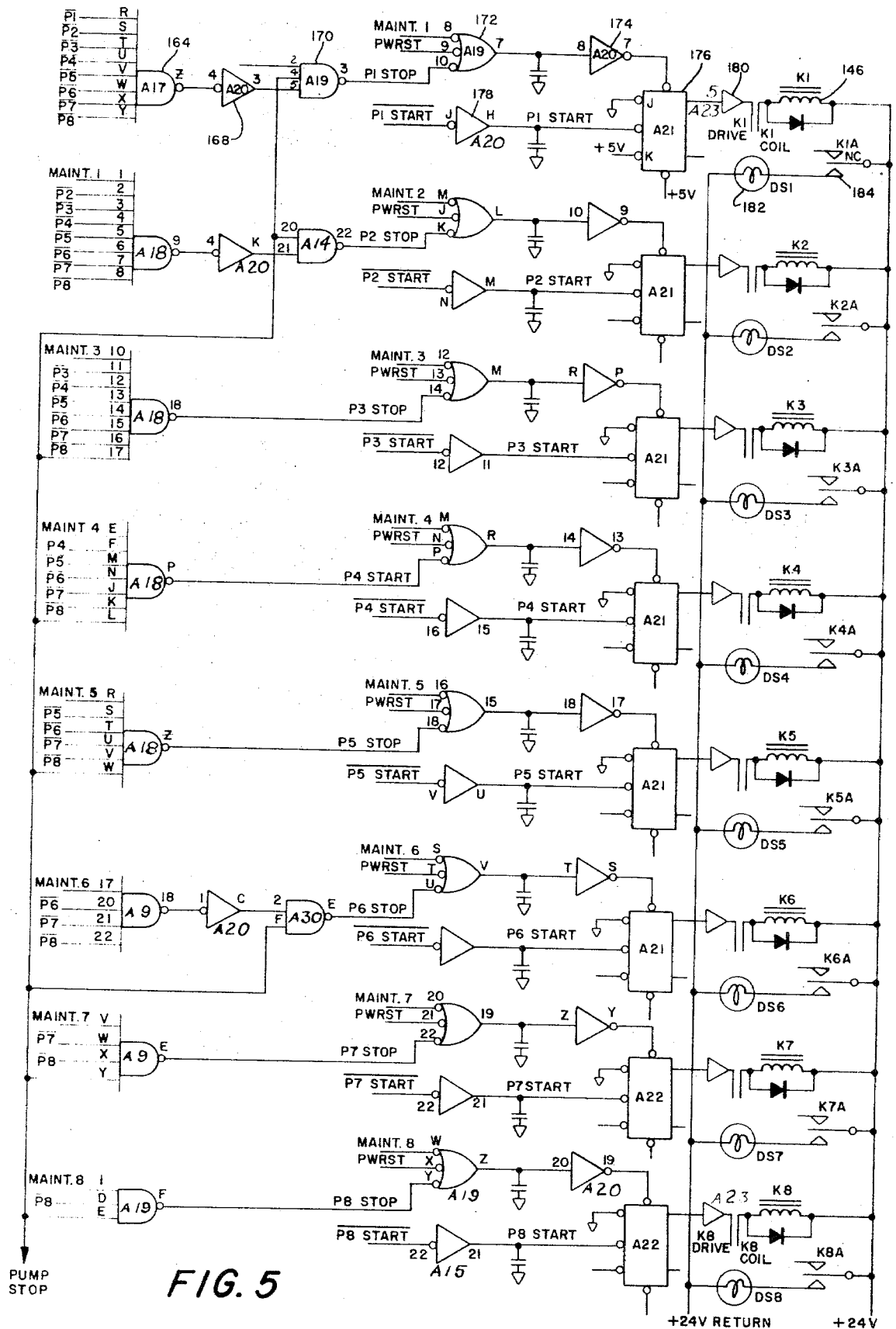
FIG. 5 is a logic diagram showing additional control components including relay coils for operating pump switches.

Referring now to FIG. 5 of the drawings, pump stop signals are applied to a set NAND gates 164, the number of inputs to each gate decreasing from top to bottom. Thus, eight signals must be present as inputs to the first gate 164 before an output signal is generated, whereas only three inputs are required for the last gate 166 before an output signal is generated. The output from the gate 164 is first to an amplifier 168, thence to a NAND gate 170 the output of which is a "Pump 1 stop" signal to a NAND gate 172, thence through an amplifier 174 to a flip-flop 176 also receiving a "Pump 1 start" input signal through an amplifier 178. The flip-flop output is through amplifier 180 to the coil of the relay 146. Associated with each relay K 1 through K 8 is an indicator lamp 182 which is illuminated on actuation of relay contacts 184. As indicated previously, the relays K 1 through K 8 also operate the relay contacts of 144, etc., illustrated in FIG. 4.

Referring now to FIG. 6 of the drawings, there is illustrated a lead pump selector switch 186 which is manually operated to permit a change in sequence in the operation of the pumps. If the pumps were used in the same operating sequence every day, the first pump normally would be used much more often than the last pump and the wear would not be uniform insofar as the first pump would go on when any demand is made on the system while the last pump may go on only on maximum demand. The lead pump selector switch 186 is provided with eight ganged poles each with eight contacts for the eight pump systems shown so that the operator may switch the sequence each day. On the first day, for example, in the position shown, pump No. 1 would be the lead pump to start a sequence of operation in which pumps Nos. 2,3,4,5,6,7 and 8 would go on in sequence according to demand needs. On the second day the operator may move the ganged poles of the switch 186 down one index stop to the second contact so that pump No. 2 will be the lead pump and the sequence would be pumps Nos. 2,3,4,5,6,7,8 and 1. In this case pump No. 1 would be the last one to go on. Similarly, on the third day pump No. 3 would be the lead pump and pumps No. 1 and No. 2 would be the last pumps to go on.

Referring now to FIG. 7, there is shown a pump condition sensing circuit which senses those pumps that are on and those that are off as well as those pumps that are out of service. Those pumps that are out of service or otherwise not available for operation are handled as through they were not present in the system.

While the invention has been described with particular reference to the control of a plurality of pumps in a pumping system, it may also be used to advantage in other related variable demand applications such as to operate the sequence of a group of electric generators leading into a common network wherein the demand load on that network may be monitored in such a fashion that a generated digital signal representative of the load on the particular system may be counted in the same fashion disclosed herein for purposes of increasing or decreasing the number of power units tied into the system.

Having thus described the invention what I claim and desire to obtain by Letters Patent of the United States is:

1. A system for controlling the sequence of operation of a plurality of prime movers each drivingly connected to a power unit having an output to a common conduit, comprising
   a. a transducer operatively connected to said conduit and adapted to generate alternating output signals the frequency of which is analog to the load on said conduit,
   b. analog to digital converting means operatively connected to said transducer for converting said alternating signals to digital signals,
   c. electronic digital counting means operatively connected to said converting means for counting said digital signals,
   d. electronic digital storage means operatively connected to said counting means for storing the count in said counter,
   e. said counting and storage means providing a digital memory for said system,
   f. electronic digital timing means connected to said counting means and said storage means for generating digital timing signals adapted to transfer the count from said counting means to said storage means,
   g. electronic digital logic means connected to said storage means and said timing means for processing said count and generating count-related sequential command signals, and,
   h. electronic digital switching means operatively connected to said logic means and to said prime movers for selectively transferring command signals from said logic means to said prime movers and interrogation signals from said prime movers to said logic means,
   i. said system defining a closed loop feedback circuit with said conduit and prime movers.

2. A system according to claim 1 wherein said transducer is a turbine meter.

3. A system according to claim 1 wherein said switching means is provided with different operative positions for selectively changing the operating sequence of said prime movers.

4. A system according to claim 1 wherein said switching means includes manually operative portions for selectively disconnecting said power units from said system.

5. A system according to claim 1 wherein said prime movers are electric motors and said power units are pumps.

6. A system according to claim 1 wherein said switching means includes manual override means for selectively changing said system from an automatic mode of operation to a manual mode of operation.

7. A system for dispensing liquid, comprising
a. a conduit for said liquid,
b. a plurality of pumps connected to said conduit,
c. a motor drivingly connected to each of said pumps,
d. digital signal generating means operatively connected to said conduit for generating digital signals proportioned to the flow in said conduit,
e. digital counting and memory means including a counter and register connected to said signal generatig means,
f. strobe timing means connected to said counting means for cyclically counting the output of said signal generating means,
g. switching means connected to each of said motors, and,
h. digital logic means connected to said counting and memory means, said timing means and said switching means for cyclically interrogating the status of said motors and pumps and for stopping and starting said motors in a predetermined sequence and in numbers related to the count in said counting and memory means,
i. all of said means defining a closed loop feedback control circuit with said conduit pumps and motors.

8. A system according to claim 7 wherein said switching means is provided with different operative positions for selectively changing the operating sequence of said motors.

9. A system according to claim 7 wherein said digital signal generating means includes a turbine meter adapted to generate alternating output signals the frequency of which is related to the flow in said conduit and frequency to digital converting means connected to said meter for converting said output signals into digital signals.

10. A system according to claim 7 wherein said switching means includes individual manual switches connected to each of said motors for selectively engaging and disengaging any of said motors from said system.

* * * * *